(12) United States Patent
Huang

(10) Patent No.: US 7,717,579 B2
(45) Date of Patent: May 18, 2010

(54) LED DISPLAY DEVICE FOR DISPLAYING PATTERN ON ROTATABLE OBJECT

(76) Inventor: Wan-Hsiang Huang, 235 Chung-Ho, Box 8-24, Taipei (TW)

( * ) Notice: Subject to any disclaimer, the term of this patent is extended or adjusted under 35 U.S.C. 154(b) by 93 days.

(21) Appl. No.: 12/188,200

(22) Filed: Aug. 7, 2008

(65) Prior Publication Data

US 2010/0033945 A1 Feb. 11, 2010

(51) Int. Cl.
*F21V 21/30* (2006.01)
(52) U.S. Cl. .................... 362/35; 362/500; 362/192; 362/231
(58) Field of Classification Search ................ 362/500, 362/35, 192, 231
See application file for complete search history.

(56) References Cited

U.S. PATENT DOCUMENTS 5,506,453 A * 4/1996 McCombs .................... 290/44
6,086,214 A * 7/2000 Ridge .......................... 362/96
6,398,381 B1 * 6/2002 Tseng .......................... 362/96
6,588,913 B1 * 7/2003 Huang ......................... 362/96
6,893,138 B1 * 5/2005 Jones .......................... 362/96
6,910,788 B2 * 6/2005 Jones ......................... 362/506
6,923,552 B2 * 8/2005 Tseng ......................... 362/192
7,036,959 B2 * 5/2006 Chiu .......................... 362/352

* cited by examiner

*Primary Examiner*—Ali Alavi

(57) ABSTRACT

An LED display device for displaying a pattern on a rotatable object is disclosed. When the rotating object rotates with a high speed, the pattern will be displayed. The device comprises a first printed circuit board on the rotatable object; at least one bank of light emitting diodes being arranged on the first printed circuit board; a second printed circuit board having a bank of elastic sheets; a third printed circuit board having a conductive pattern thereon; the third printed circuit board do not rotate with the rotatable object. The first printed circuit board and second printed circuit board will rotate with the rotatable object; and the elastic sheets are capable of being in contact with the pattern of the third printed circuit board; and each elastic sheet is connected to a corresponding LED; and the third printed circuit board is connected to all the light emitting diodes.

9 Claims, 7 Drawing Sheets

LED DISPLAY DEVICE FOR DISPLAYING PATTERN ON ROTATABLE OBJECT

FIELD OF THE INVENTION

The present invention relates to patterns display be LEDs, and particularly to an LED display device for displaying a pattern on a rotatable object, wherein a bank of light emitting diodes are arranged on a rotatable object. By the present invention, when the rotatable object rotates, by the affect of photogene, the light emitting diodes will display with a predetermined pattern which can be viewed clearly.

BACKGROUND OF THE INVENTION

There are many prior arts about the display of LED which are mainly used for indications, decorations and advertisements.

For example, in U.S. Pat. No. 7,036,959, a LED lampshade for advertisement brand and decoration is disclosed. The device comprises an LED lampshade for advertisement brand and decoration which comprises a deformable cover having two tenons at two ends; the cover being originally a flat shape; after assembly, the cover having a U shape; and a seat having two trenches positioned corresponding to the two tenons of the cover. The seat has a groove for locating an LED lamp. Two lower ends of the seat have the tenons, respectively. An upper side of each tenon has a stopper; and a transparent portion is formed on the cover. The groove is formed between the two trenches. Each trench has a corresponding elastomer aside the trench; each elastomer has a corresponding seat notch for receiving the elastomer as the elastomer is pressed downwards. In assembly, the two tenons of the cover are inserted into the trenches of the seat so that the cover is formed on the seat.

In another prior art, U.S. Pat. No. 6,910,788 A wheel light device for a vehicle with an electrical battery, in that, wheels, fenders and wheel wells that shines light onto and in front of one of each of the wheels of the vehicle. The device includes LED bulbs in a casing and a reflector that attaches to the bulbs to direct light onto the wheels of a vehicle. A waterseal canal, for draining any water and condensation that may accumulate within the wheel light device, and a waterproofing gasket, for sealing the device from any water reaching its components, protect the device from water. There are several different embodiments of the invention including an outer fender flare mounted embodiment with multiple LED bulbs, an inner fender mounted embodiment with multiple LED bulbs, provisions to address arched wheel wells or horizontally straight wheel wells, various safety light provisions in addition to additional supplemental features.

However in all prior arts, maybe the LEDs can provide the function of advertisement or display, but no prior art can provide the function for displaying a pattern on a rotating wheel with clear vision so as to have the function of advertisement. This is because the wheel is a rotating unit which will cause the image to rotate therewith so that the pattern thereon will become vague. As a result the viewer can not see the advertising patter clearly even the viewer can not see what displayed on the wheel.

SUMMARY OF THE INVENTION

Accordingly, the object of the present invention is to provide an LED display device for displaying a pattern on a rotatable object, wherein a bank of light emitting diodes are arranged on a rotatable object. By the present invention, when the rotatable object rotates, by the affect of photogene, the light emitting diodes will display a predetermined pattern which can be viewed clearly so as to achieve the object of alerting the pattern to people. The present invention is especially suitable for wheels. Rotation of the wheel will cause the pattern to be displayed with a flash affect which cannot achieve by other prior art.

To achieve above object, the present invention provides an LED display device for displaying a pattern on a rotatable object; wherein when the rotating object rotates with a high speed, the pattern will display; the device comprising: a first printed circuit board on the rotatable object; at least one bank of light emitting diodes being arranged on the first printed circuit board; a second printed circuit board having a bank of elastic sheets; the number of the elastic sheets being corresponding to that of the light emitting diodes; a third printed circuit board having a pattern thereon; the pattern being made of conductive materials; the third printed circuit board do not rotate with the rotatable object; The second printed circuit board having elastic sheets is installed on a rotating shaft of the rotatable object so that the first printed circuit board on the rotatable object and second printed circuit board having elastic sheets will rotate with the rotatable object; and the elastic sheets are capable of being in contact with the pattern of the third printed circuit board. Each elastic sheet is connected to a corresponding LED; the third printed circuit board is connected to all the light emitting diodes; as one elastic sheets is in contact with the pattern. The elastic sheet, pattern and one light emitting diode connected to the elastic sheets will form as a circuit loop; and the light emitting diode will light up.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
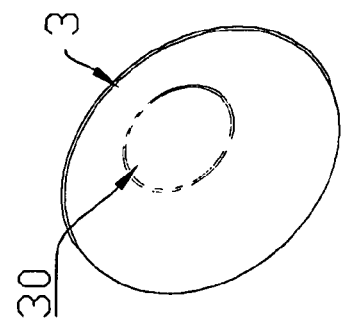
FIGS. 1(A) to 1(C) are schematic views showing the elements of the present invention.
Figure 1:
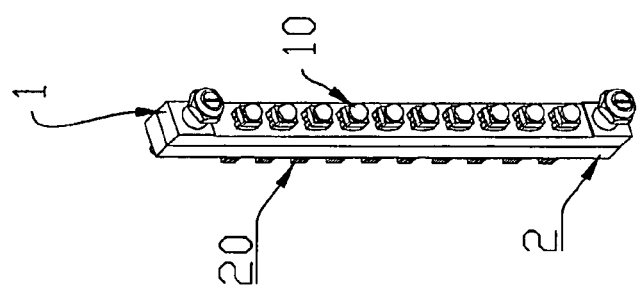
Figure 1:
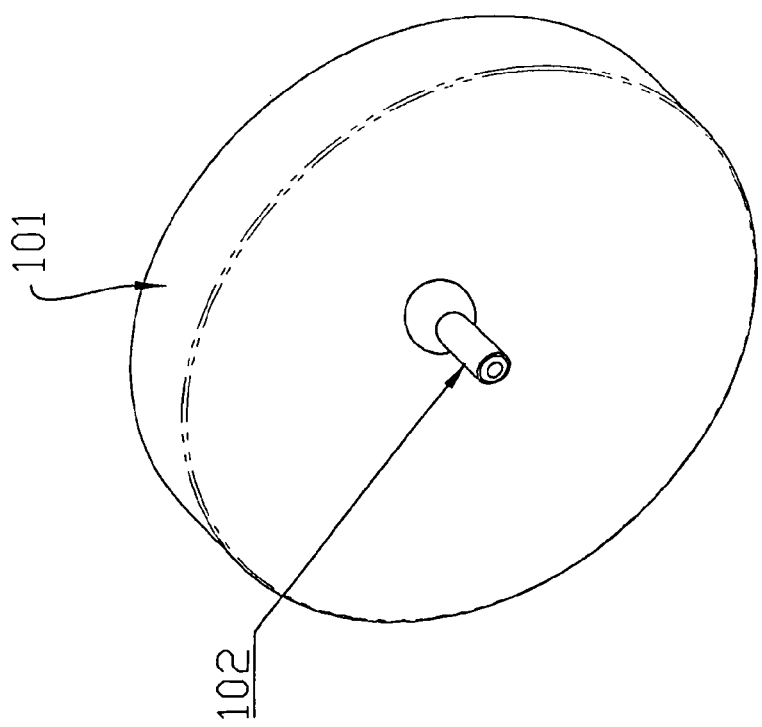
Figure 2:
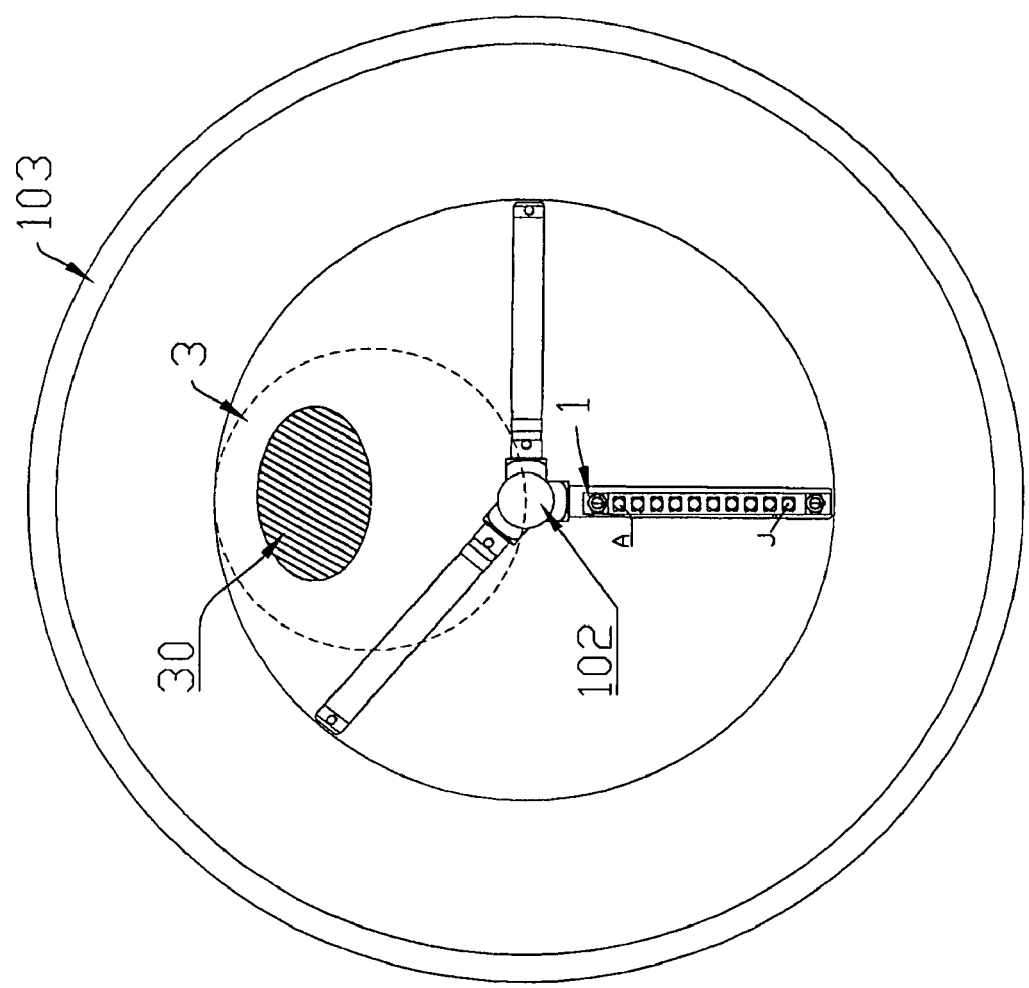
FIG. 2(A) is a schematic view showing that the present invention is installed to a rotating object.
FIG. 2(B) is a schematic view showing the connection of the present invention.
Figure 2:
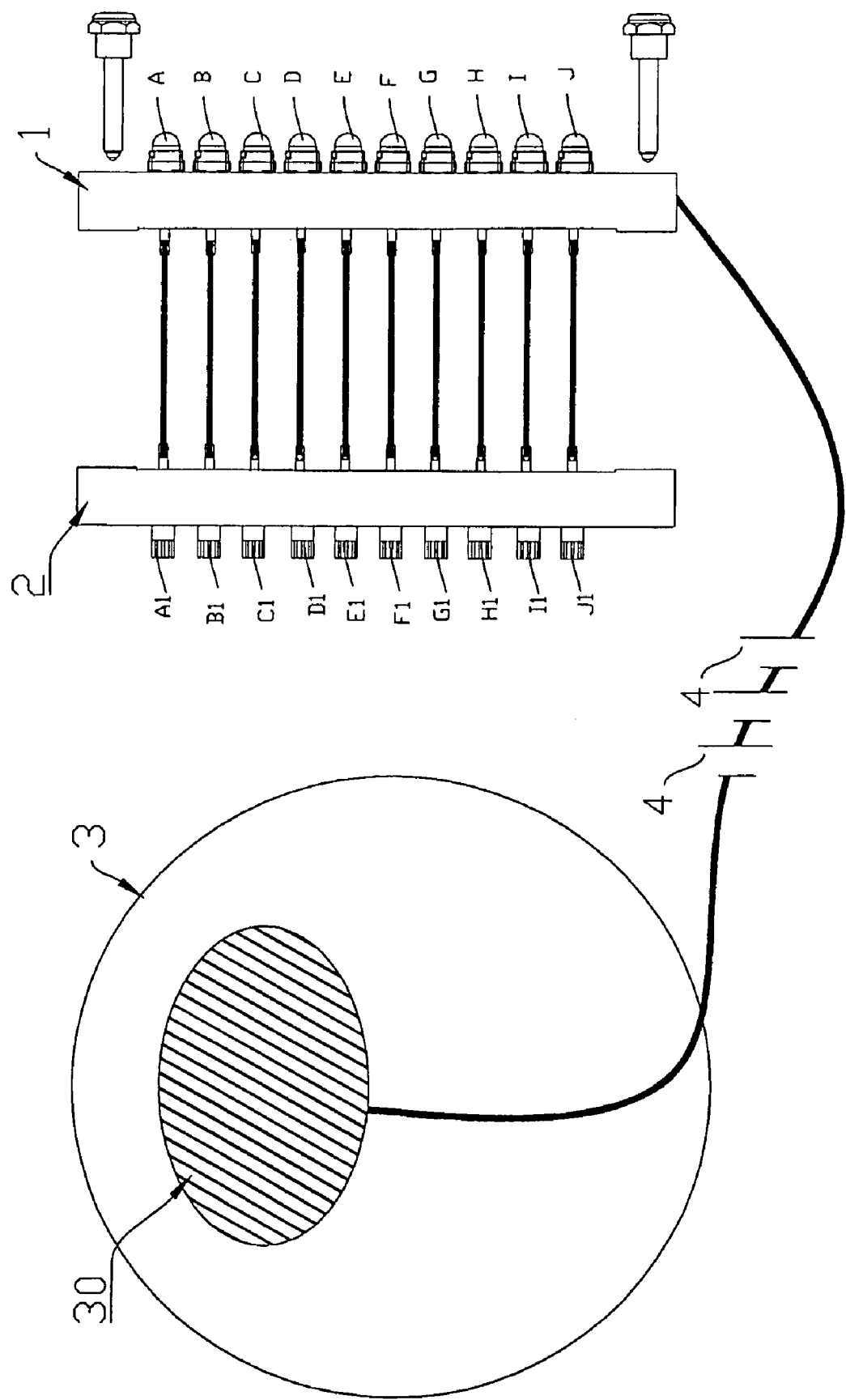
Figure 3:
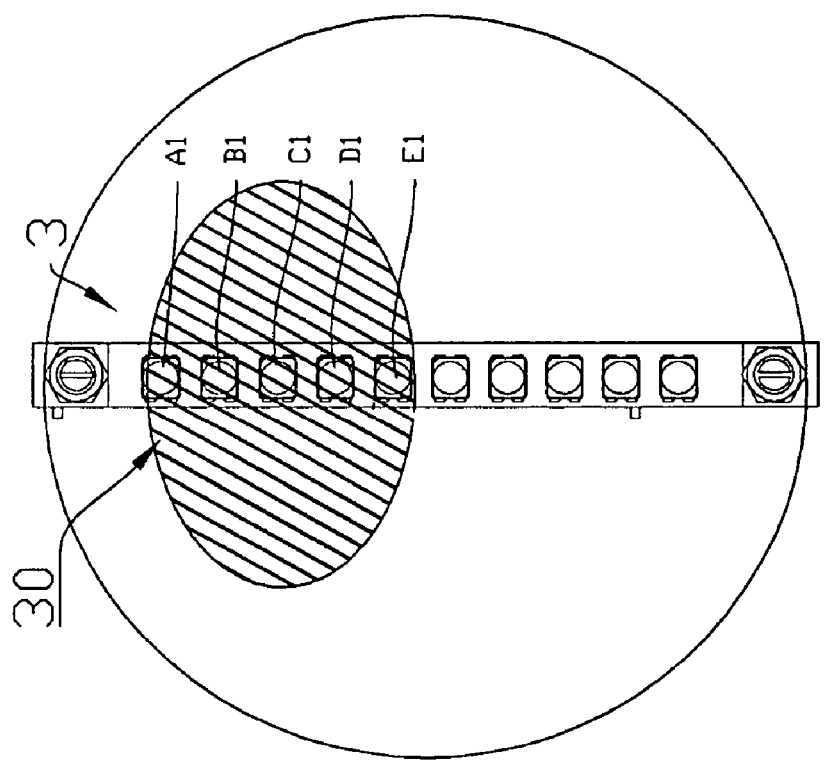
FIGS. 3(A) to 3(D) are schematic view showing the operation of the present invention.
Figure 3:
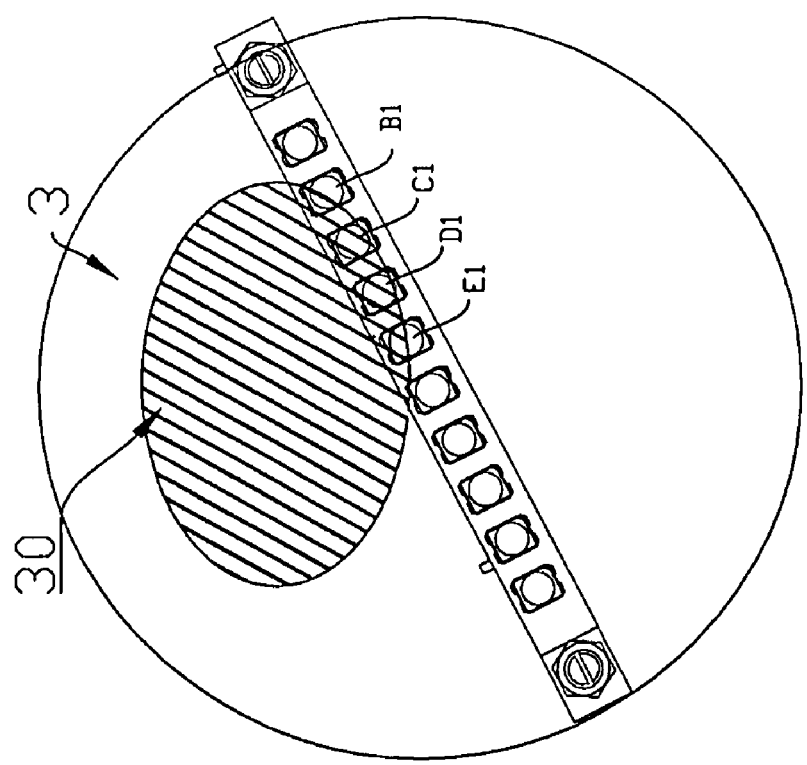
Figure 3:
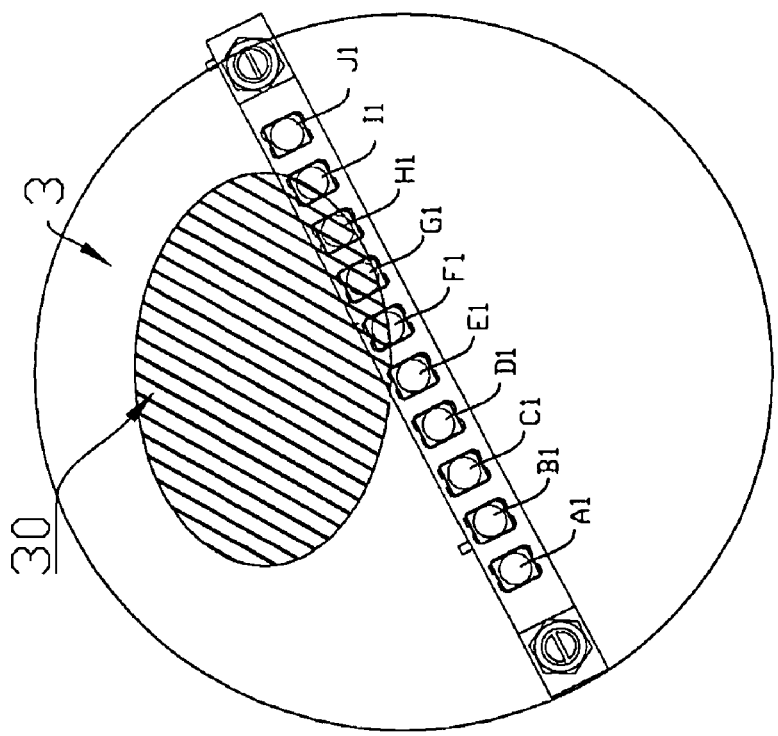
Figure 3:
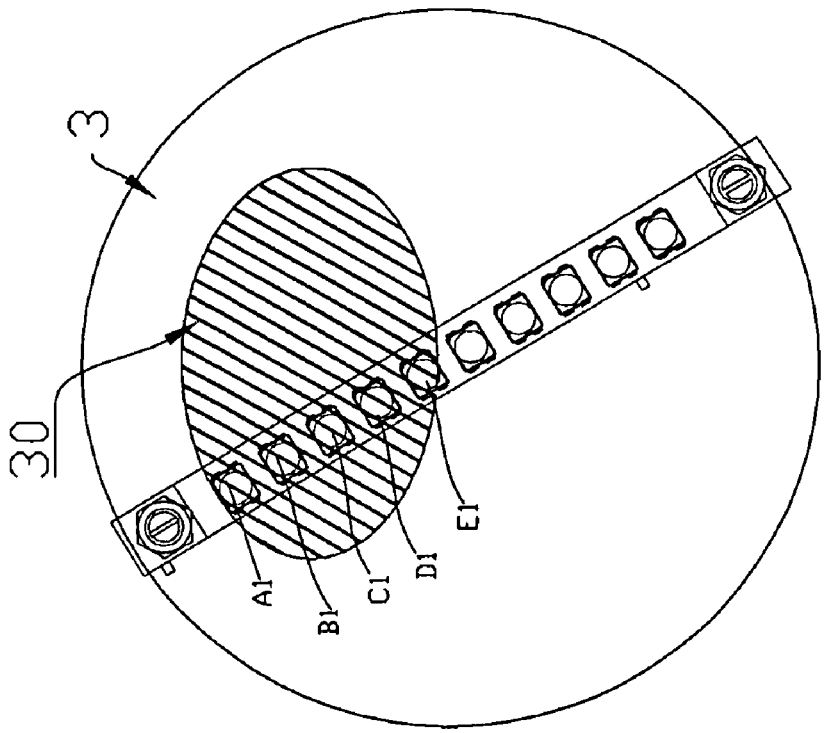
Figure 4:
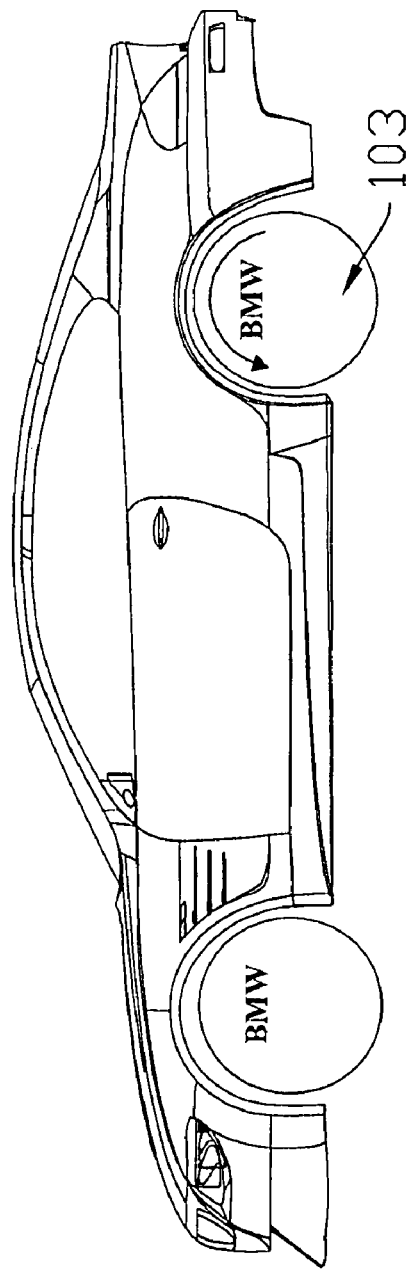
FIGS. 4(A) to 4(B) show the application of the present invention, where the present invention is applied to cars for displaying the brands of the car manufacturers.
Figure 4:
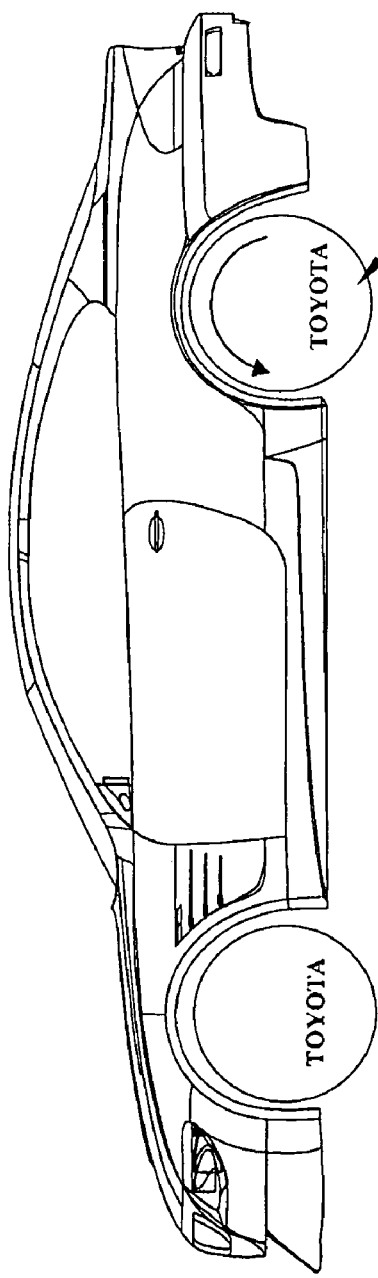

Referring to FIGS. 1(A) to (C), FIG. 2(A), FIGS. 3(A) to 3(D); and FIGS. 4(A) to 4(B), the present invention relates to a pattern display device by LEDs on a rotating object. A bank of LEDs are arranged on a rotatable object 101. When the rotatable object 101 rotates with high speeds, a pattern (may be texts or figures) is displayed by the LEDs. The present invention has improved the defect in the prior art. In the prior art, the pattern on a high speed rotatable object can not be clearly identified. The structure of the present invention will be described in detail in the following.

A plurality of printed circuit boards are included.

A first printed circuit board 1 on the rotatable object is arranged with a bank of light emitting diodes 10. The first printed circuit board 1 on the rotatable object is arranged at one outer side of the rotatable object 101 which can be easily viewed by viewers.

A second printed circuit board 2 has a bank of elastic sheets 20. The number of the elastic sheets 20 are corresponding to that of the light emitting diodes 10.

In the present invention, the second printed circuit board 2 having elastic sheets 20 is installed on a rotating shaft 102 of the rotatable object 101 so that the first printed circuit board 1 on the rotatable object and second printed circuit board 2 having elastic sheets 20 will rotate with the rotatable object 101.

A third printed circuit board 3 has a pattern 30 thereon. The pattern 30 may be texts or figures. The pattern 30 may be made of copper foil or other conductive materials. The third printed circuit board 3 does not rotate with the rotatable object 101.

In the present invention, each elastic sheet 20 is electrically connected to a corresponding LED 10. The third printed circuit board 3 is electrically connected to all the light emitting diodes 10. As one elastic sheet 20 is in contact with the pattern 30. The elastic sheets 20, the pattern 30 and the light emitting diode 10 connected to the elastic sheets 20 will form as a circuit loop. The light emitting diode 10 will light up.

Figure 5:
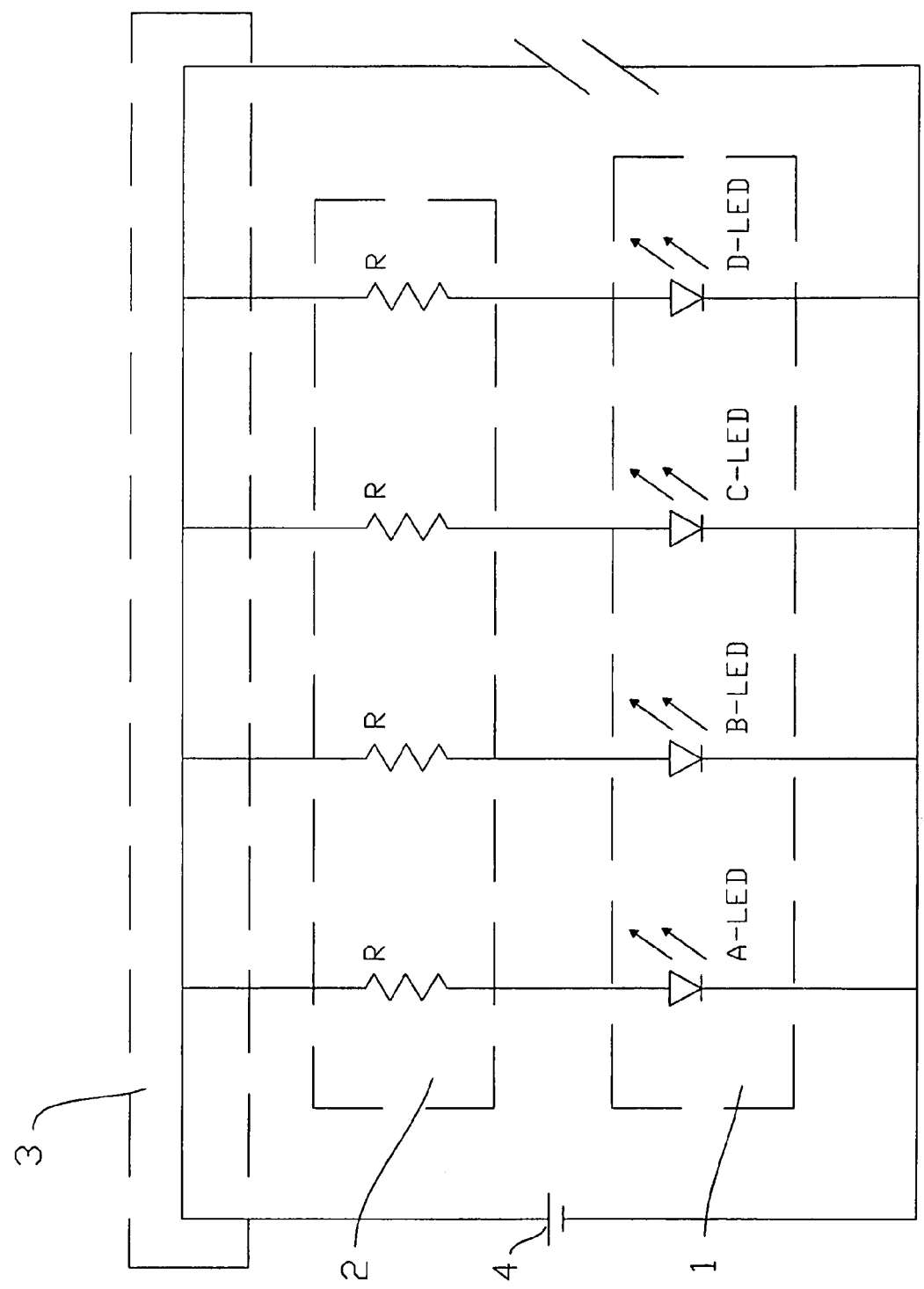
FIG. 5 shows the circuit arrangement of the present invention.

Referring to FIG. 5, the circuit arrangement of the present invention is illustrated. In the circuit, the light emitting diodes 10 are connected in parallel. The elastic sheets 20 are presented by resistors R which is arranged between light emitting diodes 10 and the third printed circuit board 3 having the pattern 30. A voltage source 4 is connected between output ends of the light emitting diodes 10 and the third printed circuit board 3 so as to form with a loop as illustrated in FIG. 5. In the present invention, the voltage source may be replaced by a current source.

The present invention can be applied to various rotatable objects. In the following, a wheel rotating with a high speed and a predetermined pattern are used as an example for describing the operation and effect of the present invention.

A wheel 103 is installed with a first printed circuit board 1 and is installed to a the axle 102. The second printed circuit board 2 is installed to an axle 102. A third printed circuit board 3 is fixed, while is without rotating with the wheel 103. The third printed circuit board 3 has a pattern 30 (referring to FIGS. 2(A) and 2(B)). The pattern 30 is a copper foil which is connected to the positive electrodes of the light emitting diodes 10 on the first printed circuit board 1. Other area of the third printed circuit board 3 facing the second printed circuit board 2 has no conductive material so as to form as an insulation area. Referring to FIG. 2(B), the light emitting diodes A, B, C, . . . , J are connected to the corresponding elastic sheets A1, B1, C1, . . . , J1 on the second printed circuit board 2. A voltage source is connected between the third printed circuit board 3 and the first printed circuit board 1. As the wheel rotation, the elastic sheets 20 on the second printed circuit board 2 will rotate so as to wipe through the pattern 30 on the third printed circuit board 3. The detailed action about the contact of the second printed circuit board 2 and the third printed circuit board 3 will be described herein. Referring to FIG. 3(A), when the elastic sheets (B1, C1, D1 and E1) rotate through the pattern 30, the elastic sheets (B1, C1, D1 and E1), the light emitting diodes (B, C, D, and E) and the pattern 30 are formed as loops so that the light emitting diodes (B, C, D, and E) will light up, while other light emitting diodes will not light up since they are not conductive. FIG. 3B shows that in the next timing, the elastic sheets A1, B1, C1, D1, and E1 contact the third printed circuit board 3 and thus the light emitting diodes A, B, C, D and E light up. FIG. 3C shows that in the next timing, the elastic sheets A1, B1, C1, D1, and E1 contact the third printed circuit board 3 and thus the light emitting diodes A, B, C, D and E light up. FIG. 3D shows that in the next timing, the elastic sheets E1, F1, G1, H1 and I1 contact the third printed circuit board 3 and thus the light emitting diodes E, F, G, H and I light up. Thus the light emitting diodes light up at different timings according to the pattern 30 so as to display a pattern as the pattern 30 as the wheel rotates.

As the wheel rotates with a high speed, the printed circuit boards will rotate with the wheel. Due to the effect of photogene, when the wheel rotates through an angle, the LEDs will light up according to the contact result that the elastic sheets 20 contact the pattern 30 on the third printed circuit board 3 so as to present a continuous pattern as a whole frame.

In the following, we will explain the principle about this phenomenon by an example. For example a car drives with a speed of 60 kilometer per hour with wheels having a diameter of 33 centimeters. The pattern in the third printed circuit board is desired to cover an angle range of 120 degrees. Thus, the speed can be converted into meters per second by the operation that 60 (km/hr)×1000 (m/km)×1/3600 (hr/s) =16.6666 (m/s). A periphery of the wheel is 2πR=2×3.14× 0.33 m=2.07 m. Thus the wheel rotates through 16.6666÷2.07=8 circle per second. That is, the wheel needs 0.125 second for rotating through one circle. If the pattern occupies 120 degrees (⅓ circle), the time showing the pattern as the wheel rotates through one circle is 0.0417 second. However in this short time period, human eyes will feel that the area sweeping through by the light emitting diodes is a continuous pattern as the pattern 30 on the third printed circuit board 3.

Furthermore, as we known the response time for the light emitting diodes to light up as a current to flow thereto is about 80 nanoseconds (ns), which is very short as comparing with the 0.0417 second per circle. Thus it can assure that the displayed pattern on the wheel has a sufficient resolution to make people view the pattern clearly.

For the speed of 60 km/h, it is 60 (km/hr)×1000000 (mm/ km)×1/3600 (hr/s)=1666.6666 (mm/s). Thus the displacement is 1666.6666 (m/s)×80×10−9S=0.0013333 mm. It supports that the light emitting diodes can respond the contact result real time.

The preferred embodiment of the present invention is that the present invention is used to tires of vehicles for advertisement, for example to display the LOGO of the manufacturers of the vehicles, such as BMW, BENZ, TOYOTA, etc.

In the present invention, the first printed circuit board 1 on the rotatable object rotates with the rotatable object. The light emitting diodes may be arranged as a bank, a half bank, a plurality of banks.

In the present invention, each light emitting diode may be formed by a plurality of LED sets. Each LED set includes a plurality of LED of different colors. Such as each LED set includes three LEDs, which a red LED, a green LED and a blue LED so as to present various colors as desired by corresponding wiring methods. Generally, the lifetime of an LED may be over 100,000 hours which is sufficient for use.

The present invention can be used to other rotating object, such as windmills, motorcycles, fans, rotatable advertisement boards, propellers of planes or helicopters; etc.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An LED display device for displaying a pattern on a rotatable object; wherein when the rotating object rotates with a high speed, the pattern will display; the device comprising:

a first printed circuit board on the rotatable object; at least one bank of light emitting diodes being arranged on the first printed circuit board;

a second printed circuit board having a bank of elastic sheets; the number of the elastic sheets being corresponding to that of the light emitting diodes;

a third printed circuit board having a pattern thereon; the pattern being made of conductive materials; the third printed circuit board do not rotate with the rotatable object;

wherein the second printed circuit board having elastic sheets is installed on a rotating shaft of the rotatable object so that the first printed circuit board on the rotatable object and second printed circuit board having elastic sheets will rotate with the rotatable object; and the elastic sheets are capable of contacting the pattern of the third printed circuit board; and each elastic sheet is connected to a corresponding LED; the third printed circuit board is connected to all the light emitting diodes; as one elastic sheets is in contact with the pattern; the elastic sheet, pattern and one light emitting diode connected to the elastic sheets will form as a circuit loop; and the light emitting diode will light up.

2. The LED display device for displaying a pattern on a rotatable object as claimed in claim 1, further comprising a voltage source connected between output ends of the light emitting diodes and the third printed circuit board so as to form with a loop.

3. The LED display device for displaying a pattern on a rotatable object as claimed in claim 2, further comprising a current source connected between output ends of the light emitting diodes and the third printed circuit board so as to form with a loop.

4. The LED display device for displaying a pattern on a rotatable object as claimed in claim 1, wherein the first printed circuit board is arranged at one outer side of the rotatable object which can be easily viewed by viewers.

5. The LED display device for displaying a pattern on a rotatable object as claimed in claim 1, wherein the pattern is at least one of texts and figures.

6. The LED display device for displaying a pattern on a rotatable object as claimed in claim 1, wherein pattern is made of copper foil.

7. The LED display device for displaying a pattern on a rotatable object as claimed in claim 1, wherein the pattern is a LOGO for vehicle manufacturers.

8. The LED display device for displaying a pattern on a rotatable object as claimed in claim 1, wherein the light emitting diodes are arranged as a bank or a plurality of banks according to the rotation speed of the rotatable object.

9. The LED display device for displaying a pattern on a rotatable object as claimed in claim 1, wherein the rotatable object is selected from windmills, vehicles, electric fans, propellers of planes and helicopters, and advertisement boards.

* * * * *